(No Model.)
D. BOWMAN.
COMBINED BICYCLE LOCK AND HOLDER.
No. 606,118. Patented June 21, 1898.
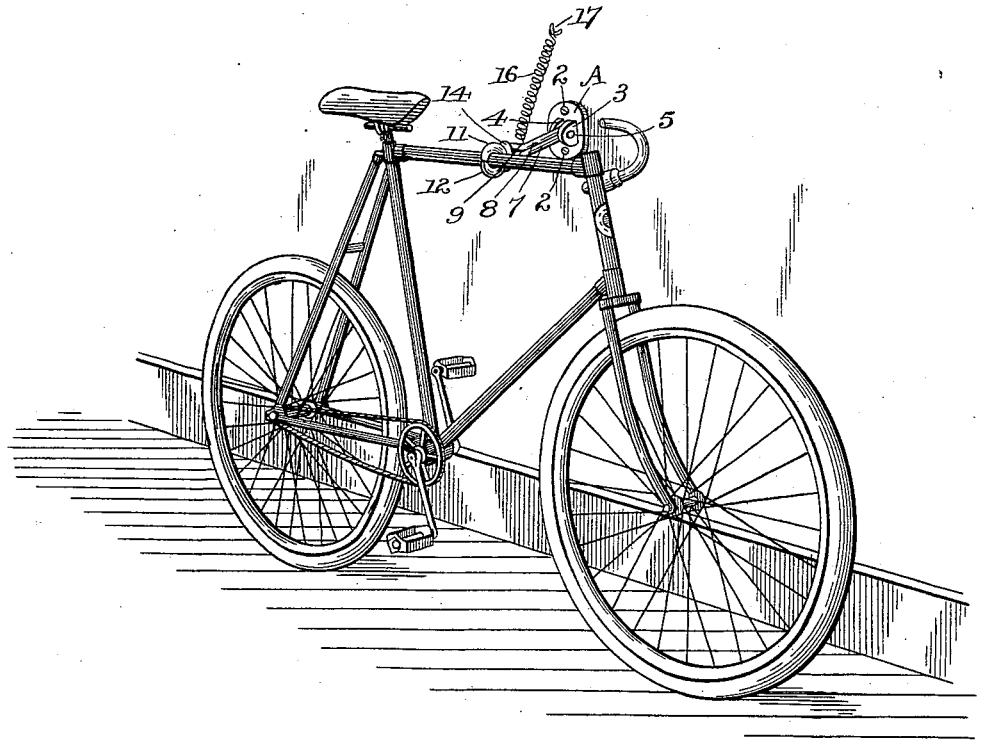
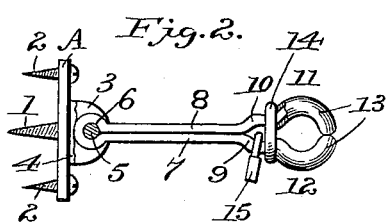
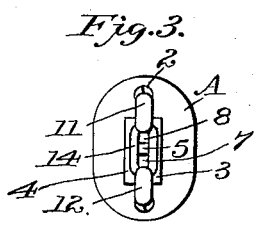
Witnesses
Edwin G. McKee
L. M. Graves
Inventor
David Bowman
by John Wedderburn
Attorney

UNITED STATES PATENT OFFICE.

DAVID BOWMAN, OF BERLIN, CANADA.

COMBINED BICYCLE LOCK AND HOLDER.

SPECIFICATION forming part of Letters Patent No. 606,118, dated June 21, 1898.

Application filed August 4, 1896. Renewed February 28, 1898. Serial No. 672,121. (No model.)

*To all whom it may concern:*

Be it known that I, DAVID BOWMAN, a subject of the Queen of Great Britain, residing at Berlin, Ontario, Canada, have invented certain new and useful Improvements in a Combined Bicycle Lock and Holder; and I do hereby declare the following to be a full, clear, and exact description of the invention, such as will enable others skilled in the art to which it appertains to make and use the same.

My invention relates to that class of combined bicycle locks and holders which are adapted for connection to a wall or other fixed object. One of the disadvantages incident to the use of those locks and supports of the class described which lock around or clasp the tire and rim of the wheel is that should the bicycle be jarred or struck the wheel is liable to become injured.

My object is to provide an improved, cheap, and simple combined lock and support which will be adapted for connection to the frame of the bicycle instead of the wheel.

A further object is to provide an improved combined lock and support which can be easily and quickly manipulated and will be adapted to support the bicycle in such an improved manner that the greater portion of the weight thereof will be taken from the tires, so that should the latter be deflated they will not be injured.

Having these objects in view, my invention consists of a combined bicycle support and lock comprising certain novel features and combinations of parts appearing hereinafter and particularly pointed out in the appended claims.

In the accompanying drawings, Figure 1 is a perspective view showing my invention in use. Fig. 2 is a side elevation of the device, showing it locked; and Fig. 3, a front view showing it locked.

A designates a plate or base which is provided with a centrally-disposed screw-point 1. If desirable, additional screws 2 can be employed in fastening this base to the wall or fence to which the device is connected. From the face of the base there project two parallel ears 3 and 4, through which passes a pivot screw or pin 5. The arms, now to be described, are preferably constructed of a single piece of spring-steel, so that they will normally lie open at an angle of about fifteen degrees. This piece of steel is wrapped once around the pivot-screw between the ears, as at 6. The numerals 7 and 8 designate the arms, and these are bent outwardly toward their end portions, as at 9 and 10. The end portions of the arms are formed into arc-shaped fingers 11 and 12, which form when closed together a circular opening, and these fingers are covered with rubber or some other protective covering 13. An elongated keeper 14 encircles the arms, and the major axis of this keeper is of such length that when the keeper is slid outwardly along the arms and around the bent portions 9 and 10 the fingers are prevented from opening and the portion 6 binds on the pivot-screw and holds the device rigid at the height to which it has been adjusted. A padlock 15 is used when the arms are to be locked, and the hasp of this padlock is passed in between the bent portions of the arms immediately back of the keeper, so that said keeper cannot work loose, whereby the fingers are prevented from spreading.

In winter, when the bicycle is not in use, I prefer to employ a strong coil-spring 16, which has one end connected to the upper arm at 9 and its upper end connected to a hook 17 on the wall or fence, to which the combined lock and support is fastened, as the spring exerts a lifting tendency on the bicycle, thereby taking the weight of the machine off of the tires and satisfactorily preventing injury to the latter by creasing, which would otherwise occur when the tires are deflated.

Having thus described my invention, what I claim as new, and desire to secure by Letters Patent, is—

1. In a combined bicycle lock and support, the combination with a backing, of a pivot-pin connected thereto, a piece of spring metal which is coiled around the pivot-pin and formed with free spring portions terminating in curved clamping members and normally open, and a keeper encircling the arms and adapted for manipulation to close them.

2. In a combined bicycle lock and support, the combination with pivoted arms having outwardly-bent portions and provided with curved fingers adapted to grasp a portion of the bicycle-frame, of a keeper slidable on the arms and a locking device for holding said keeper on the outwardly-extending portions of the arms, whereby the arms are prevented from spreading.

In testimony whereof I have signed this specification in the presence of two subscribing witnesses.

DAVID BOWMAN.

Witnesses:
HERBERT J. BOWMAN,
J. NOHLEDER.